(12) United States Patent
Petkov et al.

(10) Patent No.: US 12,089,174 B2
(45) Date of Patent: Sep. 10, 2024

(54) METHOD FOR TRANSMITTING DATA BETWEEN A NODE AND A BASE STATION IN A COMMUNICATION SYSTEM, AND BASE STATION AND NODE

(71) Applicant: Diehl Metering Systems GmbH, Nuremberg (DE)

(72) Inventors: Hristo Petkov, Nuremberg (DE); Thomas Lautenbacher, Erlangen (DE); Thomas Kauppert, Nuremberg (DE); Raphael Mzyk, Kammerstein (DE)

(73) Assignee: Diehl Metering Systems GmbH, Nuremberg (DE)

( * ) Notice: Subject to any disclaimer, the term of this patent is extended or adjusted under 35 U.S.C. 154(b) by 335 days.

(21) Appl. No.: 17/669,415

(22) Filed: Feb. 11, 2022

(65) Prior Publication Data

US 2022/0167295 A1 May 26, 2022

Related U.S. Application Data

(63) Continuation of application No. PCT/EP2020/071799, filed on Aug. 3, 2020.

(30) Foreign Application Priority Data

Aug. 13, 2019 (DE) ...................... 10 2019 005 686.8

(51) Int. Cl.
*H04W 56/00* (2009.01)
*H04L 5/00* (2006.01)
*H04W 72/23* (2023.01)

(52) U.S. Cl.
CPC ....... *H04W 56/0045* (2013.01); *H04L 5/0048* (2013.01); *H04W 56/0035* (2013.01); *H04W 72/23* (2023.01)

(58) Field of Classification Search
CPC .. H04B 1/0096; H04B 7/0456; H04B 7/0413; H04B 7/0682; H04B 17/0085;
(Continued)

(56) References Cited

U.S. PATENT DOCUMENTS 8,346,196 B2 * 1/2013 Haralabidis ............ H04B 15/06
455/260
8,379,752 B2 * 2/2013 Kleider ................. H04L 27/262
375/267

(Continued)

FOREIGN PATENT DOCUMENTS

DE 102005020349 B4 5/2007
DE 102010031411 A1 1/2012
(Continued)

*Primary Examiner* — Jung Liu
(74) *Attorney, Agent, or Firm* — Laurence A. Greenberg; Werner H. Stemer; Ralph E. Locher

(57) ABSTRACT

A method transmits data via radio between a node and a base station with bidirectional radio transmission-based operation. The base station has a communication module with a first frequency transmitter. The node has a communication module with a first frequency transmitter and a second frequency transmitter with a frequency lower than the first frequency transmitter. The communication module of the node is intended to transmit data in the uplink to the communication module of the base station by virtue of a radio telegram being split into two data packets transmitted successively with a temporal spacing. The communication module of the base station transmits data in the downlink to the communication module of the node by virtue of a radio telegram being split into two data packets transmitted successively with a temporal spacing. The transmission time and/or the carrier frequency of at least one of the data packets is corrected.

20 Claims, 4 Drawing Sheets

(58) Field of Classification Search
CPC .... H04B 17/12; H04B 7/0602; H04B 7/0691; H04B 17/309; H04L 12/189; H04L 27/36; H04L 65/611; H04L 27/38; H04W 52/225; H04W 72/02; H04J 11/0033; H01Q 3/2647

See application file for complete search history.

(56) References Cited

U.S. PATENT DOCUMENTS

| | | | | |
|---|---|---|---|---|
| 8,462,683 | B2* | 6/2013 | Uyehara | H04B 1/18 370/464 |
| 9,148,233 | B2* | 9/2015 | Haralabidis | H04B 1/0475 |
| 9,184,832 | B2 | 11/2015 | Kilian et al. | |
| 9,354,081 | B2 | 5/2016 | Bernhard et al. | |
| 10,616,010 | B2* | 4/2020 | Breiling | H04L 25/03343 |
| 10,624,118 | B2* | 4/2020 | Park | H04L 25/03343 |
| 10,707,948 | B2* | 7/2020 | Liang | H04L 5/14 |
| 10,735,095 | B1* | 8/2020 | Kim | H04B 10/25752 |
| 10,742,270 | B1* | 8/2020 | Kim | H04B 7/0456 |
| 10,805,142 | B2 | 10/2020 | Petkov et al. | |
| 10,819,035 | B2* | 10/2020 | Wolniansky | H01Q 13/10 |
| 10,820,070 | B2 | 10/2020 | Petkov et al. | |
| 10,826,675 | B2 | 11/2020 | Mzyk et al. | |
| 10,883,853 | B2 | 1/2021 | Petkov et al. | |
| 10,886,979 | B2* | 1/2021 | Forenza | H04B 7/0452 |
| 10,912,112 | B2* | 2/2021 | Park | H04B 7/0456 |
| 10,985,811 | B2* | 4/2021 | Forenza | H04B 7/10 |
| 11,196,467 | B2* | 12/2021 | Forenza | H04B 7/0626 |
| 11,432,198 | B2* | 8/2022 | Berg | H04W 28/18 |
| 2005/0075125 | A1 | 4/2005 | Bada et al. | |
| 2009/0201152 | A1 | 8/2009 | Karr et al. | |
| 2010/0075611 | A1 | 3/2010 | Budampati et al. | |
| 2011/0195670 | A1* | 8/2011 | Dakshinamurthy | H04B 7/0691 455/73 |
| 2012/0177026 | A1* | 7/2012 | Uyehara | H04B 7/0413 370/345 |
| 2014/0273873 | A1* | 9/2014 | Huynh | H04B 17/29 455/67.12 |
| 2016/0164745 | A1 | 6/2016 | Quigley et al. | |
| 2016/0191176 | A1* | 6/2016 | O'Keeffe | H04B 17/00 455/63.4 |
| 2017/0163452 | A1* | 6/2017 | Breiling | H04L 25/03343 |
| 2018/0159235 | A1* | 6/2018 | Wolniansky | H01Q 1/48 |
| 2019/0036834 | A1 | 1/2019 | Bernhard et al. | |
| 2019/0174527 | A1* | 6/2019 | Park | H04L 25/0224 |
| 2022/0330381 | A1* | 10/2022 | Xiong | H04W 88/06 |
| 2023/0283327 | A1* | 9/2023 | Forenza | H04B 7/024 375/267 |

FOREIGN PATENT DOCUMENTS

| | | |
|---|---|---|
| DE | 102016009197 B3 | 7/2017 |
| DE | 102016205052 A1 | 9/2017 |
| DE | 102016014375 A1 | 6/2018 |
| DE | 102018004828 A1 | 3/2019 |
| DE | 102018004815 A1 | 12/2019 |
| EP | 1791100 A1 | 5/2007 |
| EP | 2751526 B1 | 11/2015 |

* cited by examiner

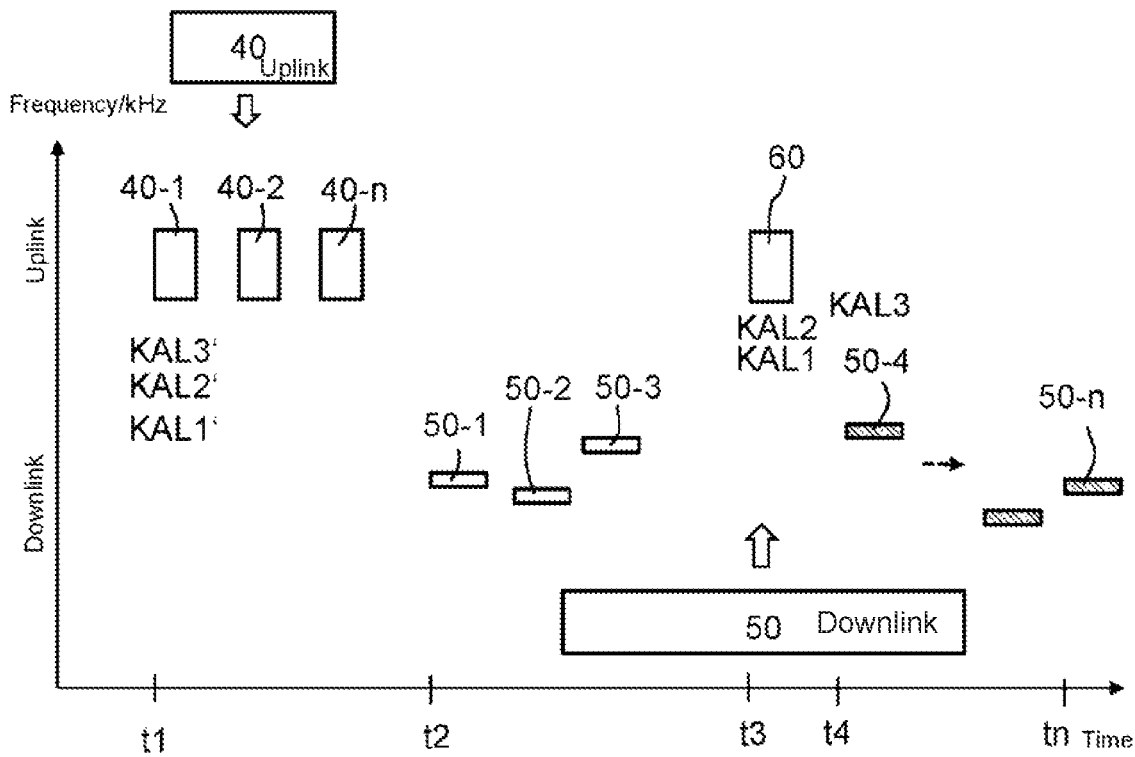
Fig. 4
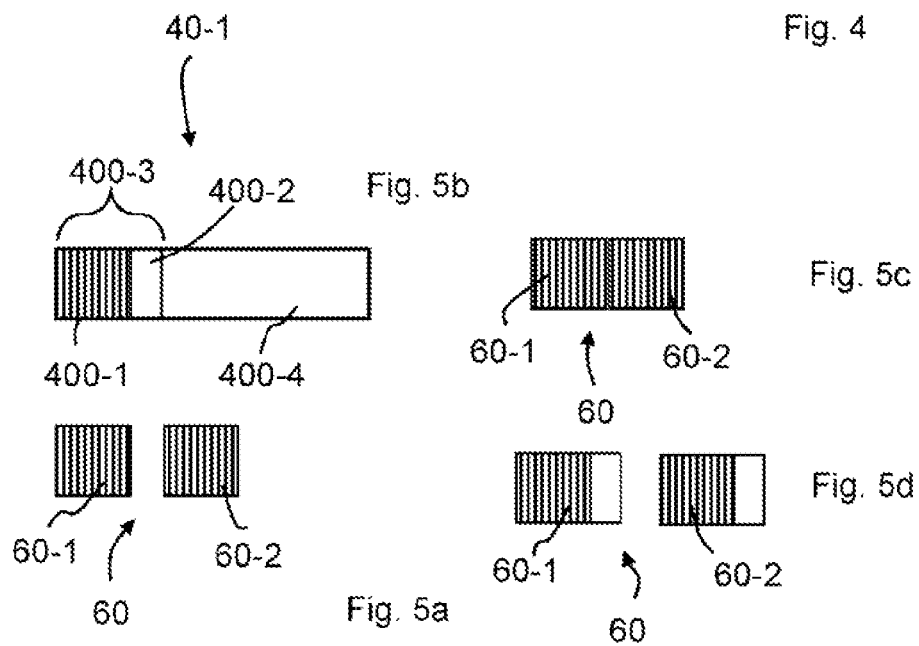
Fig. 5b
Fig. 5c
Fig. 5a
Fig. 5d

METHOD FOR TRANSMITTING DATA BETWEEN A NODE AND A BASE STATION IN A COMMUNICATION SYSTEM, AND BASE STATION AND NODE

CROSS-REFERENCE TO RELATED APPLICATION

This application is a continuation, under 35 U.S.C. § 120, of copending International Patent Application PCT/EP2020/071799, filed Aug. 3, 2020, which designated the United States; this application also claims the priority, under 35 U.S.C. § 119, of German Patent Application DE 10 2019 005 686.8, filed Aug. 13, 2019; the prior applications are herewith incorporated by reference in their entireties.

FIELD AND BACKGROUND OF THE INVENTION

The present invention relates to a method for transmitting data between at least one node and a base station in a communication system using bidirectional radio transmission operation. The invention also relates to a correspondingly prepared node. The invention is particularly suitable for use when recording the consumption of heat or energy, electricity, gas or water by means of autonomous consumption meters.

Nodes of a communication system such as e.g. smart consumption meters are normally associated with local positions such as e.g. respective residential units or residential buildings. The measurement data obtained there can be read in a wide variety of ways. Measurement data can e.g. be read by way of the electricity grid (power line). Incorporation of the consumption meters into a regional network is not possible in this case, however. Furthermore, measurement data can be transmitted in the form of data packets or telegrams by means of mobile radio technology. However, this is expensive, presupposes the installation of mobile radio modules at the consumption meters and has disadvantages regarding the high power consumption at the individual consumption meters. Furthermore, measurement data in the form of data packets or telegrams can also be transmitted by radio, for example in the industrial, scientific, medical (ISM) band frequency range or in the short range devices (SRD) band frequency range. These frequency bands have the advantage that the operators require only a general license for frequency management. However, there is the problem that the regularity with which such frequency bands are used for a wide variety of technical devices such as for example garage door controllers, baby monitors, alarm systems, WLAN, Bluetooth, smoke alarms, etc., means that interference can frequently arise. Collection of the measurement data by radio is effected either by fixed or mobile data collectors (base stations or collectors), to which the measurement data provided in the transmitters of the consumption meters are transmitted.

This involves consumption meters transmitting measurement data to a data collector in specific, very short set periods (set time, or set instant, including time deviation) and the measurement data received in these set periods being used for evaluating a consumption. A particular challenge in this case is that a communication between the data collector and consumption meters requires very exact time synchronization between the oscillators located in the region of the consumption meters and those of the data collector. The frequency generators used for oscillators of autonomous consumption meters (with a time recording function of a frequency reference device) are simple crystals having relatively low frequency and accordingly low power consumption. Production tolerances, temperature behaviors and ageing mean that such crystals have crystal errors of approximately 10-100 ppm. In a standard crystal, for example, a crystal error of 50 ppm results in a deviation of 4.3 seconds per day or 26 minutes per annum. This in turn already results in a deviation in the time synchronization in the event of small temperature variations, which become noticeable even for very short periods. The result is poor reception.

A bidirectional transmission involves an uplink transmission from the nodes to the base station being followed by a narrowband downlink transmission of data from the base station to the respective nodes. The data transmitted in the downlink are for example an acknowledgement of reception of a data packet or telegram by the base station, a request for whether for example further data are also transmitted from the respective node to the base station, control telegrams or other data/information to be transmitted to the respective node. Both in the uplink and in the downlink, the transmission of the data by telegram does not take place in one piece. Instead, the telegram is split into individual data packets having a shorter length compared to the telegram, the data packets then being successively transmitted individually at intervals of time from one another and decoded, or recombined, in the receiver. The particular problem that exists for the downlink in this case is that the number of data packets is greater than for the uplink and the time for transmitting the individual data packets therefore takes longer. Furthermore, the carrier frequency for the data packets must correspond very exactly to the carrier frequency expected by the node in order for the influence of noise to be able to be rejected as far as possible. Finally, the node must open its reception window for the downlink at the expected time, which is an additional difficulty, however, owing to the temperature-related distortion of the frequency of the node's frequency generator. Accordingly, the temperature and the advancing time to reception of the last data packet of a telegram in the downlink can cause a frequency misalignment and/or a time misalignment to occur that hampers or even prevents good reception of the data packets in the downlink.

A method as per the preamble of the claim is known from German patent DE 10 2005 020 349 B4. In the consumption recording system described therein, the consumption meters have a first clock generator (clock) with lower power consumption for continuous operation and a second clock generator with higher frequency stability and higher power consumption, which is operated only in short activation phases. According to the concept described therein, the frequency, the period duration or a variable derived therefrom is recorded in the consumption meter during the short activation phases of the second clock generator as a clock measure of the first clock generator on the basis of a comparison scale derived from the second clock generator, and the accumulated time of the first clock generator is corrected on the basis of the determined deviation. The result of this is that the timing error then corresponds to the timing error of the second clock generator of the consumption meter.

Published, non-prosecuted German patent application DE 10 2010 031 411 A1 (corresponding to U.S. Pat. No. 9,184,832), and European patent EP 2 751 526 B1 (corresponding to U.S. Pat. No. 9,354,081), describe a concept for the wireless transmission of payload data that involves the payload data being split into a plurality of channel-coded data packets and transmitted from a node to a base station via a wireless communication channel within a time interval. In the base station, the data packets are decoded and recombined to produce the payload data. According to EP 2 751 526 B1, the node for generating data packets may be designed to split a synchronization sequence into partial synchronization sequences and to provide each data packet with one of the partial synchronization sequences. Synchronization sequences are deterministic or pseudorandom binary data strings that are transmitted to the base station together with the actual payload data or sensor data in the data packets. The base station knows the synchronization sequences. By correlating the received data stream with the known synchronization sequence, the base station can ascertain the temporal position of the known synchronization sequence in the received data stream. In order to keep the data packets short, the synchronization sequence can be distributed over the individual short data packets in this case, with the result that the individual data packet has worse synchronization properties than the synchronization over multiple data packets.

In published, non-prosecuted German patent application DE 10 2016 205 052 A1 (corresponding to U.S. patent publication No. 2019/0036834), to improve the channel utilization level, a data transmitter is proposed that is configured to use an additional transmission data packet, which is sent in a gap or break between two transmission data packets, to predefine for another data transmitter a transmission time at which the other data transmitter transmits a transmission data packet, or an interval of time between two transmission data packets transmitted by the other data transmitter.

According to German patent DE 10 2016 009 197 B3, corresponding to U.S. Pat. No. No. 10,805,142, for the purpose of transmitting telegrams from a data collector to a meter, the transmitter's reference frequency is shifted in the data collector by the frequency difference between the data collector's reference frequency and a meter reference frequency following receipt of a data telegram from the meter.

Published, non-prosecuted German patent application DE 10 2018 004 828 A1, corresponding to U.S. Pat. No. 10,820,070, describes a method for transmitting data between a terminal and a data collector by radio that involves, following setup of the communication, the terminal transmitting a message to the data collector and the data collector, after receiving the message, continuing, interrupting or terminating the transmission of the data on the basis of the content of the message during the communication.

SUMMARY OF THE INVENTION

The object of the present invention is to improve the reception quality in the downlink.

With the foregoing and other objects in view there is provided, in accordance with the invention, a method for transmitting data by radio between at least one battery-operated node and a base station in a communication system using bidirectional radio transmission operation. The base station has a communication module with a first frequency generator. The at least one battery-operated node has a node communication module with a first node frequency generator and a second node frequency generator with a lower frequency than that of the first node frequency generator. The method includes transmitting the data, via the node communication module of the at least one battery-operated node, to the communication module of the base station in an uplink by splitting a radio telegram into at least two data packets being transmitted successively at intervals of time. The data is transmitted, via the communication module of the base station, to the node communication module of the at least one battery-operated node in a downlink by splitting a radio telegram into at least two data packets being transmitted successively at intervals of time. A transmission time and/or a carrier frequency of at least one of the data packets are corrected between the data packets.

According to the invention, the transmission time and/or the carrier frequency of at least one of the data packets is/are corrected between the downlink data packets. This enables the base station and the node to coordinate the transmission of the individual data packets to be sent successively in terms of the temporal position of the reception window of the node and the transmission time of the data packets and/or in terms of the carrier frequency much more exactly than was previously possible. As a result, the quality of the transmission of data in the downlink can be significantly improved despite the difficulties involved. The invention also opens up the possibility of spreading the interval of time between the data packets, i.e. pulling the data packets apart, since the influence of time and/or temperature can be compensated for by the method according to the invention. Spreading the interval of time between the data packets or pulling the data packets apart in the chronological order in turn has the advantage that significantly cheaper energy buffers can be used in the nodes, since the electrical energy available in the energy buffer no longer has to be called up for processing a large number of data packets within a very short period of time, since the period of time can now be stretched.

For the transmission of the data packets in the downlink, a calibration for the second frequency generator preferably takes place by way of the first frequency generator of the node, as a result of which a time misalignment caused by the second frequency generator is eliminated.

Expediently, an intermediate calibration packet is transmitted, for correction purposes, in the uplink from the node to the base station between the data packets, with the result that the base station knows that this calibration has taken place. From this time onward, the base station can therefore correct the intervals of time between the data packets within the transmission sequence of same.

Preferably, the transmission of the intermediate calibration packet also results in a calibration for the first frequency generator of the node and the first frequency generator of the base station, that is to say the two high-frequency frequency generators for the carrier frequency, being performed. This allows the carrier frequency of the data packets to be coordinated exactly. This results in an improved signal-to-noise ratio for the narrowband reception of the data packets.

As a rule, the base station, like the node, also has a second frequency generator (time crystal), the frequency of which is lower than that of the first frequency generator of the base station. Expediently, as a result of the transmission of the intermediate calibration packet, it is additionally also possible for a calibration for the second frequency generator of the base station to be performed in this case by way of the first frequency generator of the base station. It is thus possible for the coordination of the transmission times and the reception window to be additionally improved.

The intermediate calibration packet is preferably sent between two data packets from the plurality of data packets. The time and/or carrier frequency compensations described above can therefore be made within the sequence of a data telegram, with the result that the disadvantageous effect of the duration of the transmission of a data telegram and the resulting, in particular temperature-related, frequency deviations can be eliminated.

As a result of reception of the intermediate calibration packet, the base station can readjust the transmission time and/or the carrier frequency of each of the data packets to be generated following receipt of the intermediate calibration packet.

In addition, as a result of the calibration for the first frequency generator and the second frequency generator of the node, the node can readjust the reception time for the data packets expected after the intermediate calibration packet has been sent.

In particular, the calibration for the first frequency generator and the second frequency generator of the node can take place upon provision of the intermediate calibration packet in the node.

In particular, reception of the intermediate calibration packet can furthermore result in the calibration for the respective first frequency generator of the node and the first frequency generator of the base station taking place in the base station.

Expediently, the transmission of the data packets in the uplink in advance of the intermediate calibration packet has already resulted in a calibration for the first frequency generator and the second frequency generator of the node and/or a calibration for the first frequency generator of the node and the second frequency generator of the base station and/or a calibration for the first frequency generator of the base station and the second frequency generator of the base station having taken place, with the result that the calibrations taking place within the scope of the transmission of the intermediate calibration packet are each only readjustments for the aforementioned calibrations. There is thus no re-estimation of earlier errors (e.g. hardware errors, correction of the difference from the estimation or the like) during the calibration within the scope of the transmission of the intermediate calibration packet.

An intermediate calibration packet can preferably be sent repeatedly. This ensures an increased reception probability if an intermediate calibration packet is lost in the uplink due to a disturbance or the like.

According to an expedient configuration of the method according to the invention, the correction of the transmission time and/or the carrier frequency of the downlink data packets takes place multiple times in the chronological order of same. This allows a continuous time and/or carrier frequency adjustment to take place.

The intermediate calibration packet is expediently significantly shorter than a conventional data packet of a telegram in order to increase the reception probability for same in the transmission channel. In particular, this also allows the base station to react more quickly to an applicable intermediate calibration packet than in the case of a conventional data packet in the uplink.

The intermediate calibration packet sent can be exclusively pilots (bits or bit sequences known to the node and the base station) and/or ID data and/or packet core data. It is assumed here that the frequency has changed only minimally (e.g. <10 Hz), with the result that even without an ID it is possible to check that the same node (meter) is involved.

If pilots are sent, they can be sent as pilot sequences (e.g. two pilot sequences) at defined intervals or they can also be sent directly successively.

The mean (i.e. average) pause between two data packets of the downlink data packets is expediently greater than 500 ms, preferably greater than 700 ms, particularly preferably greater than 900 ms.

Preferably, the difference between a calibration for the first frequency generator and the second frequency generator of the node and/or a calibration for the first frequency generator of the node and the first frequency generator of the base station and/or a calibration for the first frequency generator of the base station and the second frequency generator of the base station for a previous transmission of data packets with a corresponding subsequent calibration using an intermediate calibration packet can in each case be determined in terms of its frequency difference and taken into account in the base station and/or in the node. In particular, the relevant difference between the calibration for the first frequency generator of the node and the first frequency generator of the base station can be taken into account for the correction of the carrier frequency in the base station.

The present invention also relates to a node according to the features of the independent node claim.

Other features which are considered as characteristic for the invention are set forth in the appended claims.

Although the invention is illustrated and described herein as embodied in a method for transmitting data between a node and a base station in a communication system, and a base station and node, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 4 is a highly simplified block diagram showing sending of an intermediate calibration packet according to an illustrative embodiment of the invention, and FIGS. 5A-5D are highly simplified schematic depictions of examples of different forms of an intermediate calibration packet according to the invention compared to a conventional data packet.

DETAILED DESCRIPTION OF THE INVENTION

Figure 1:
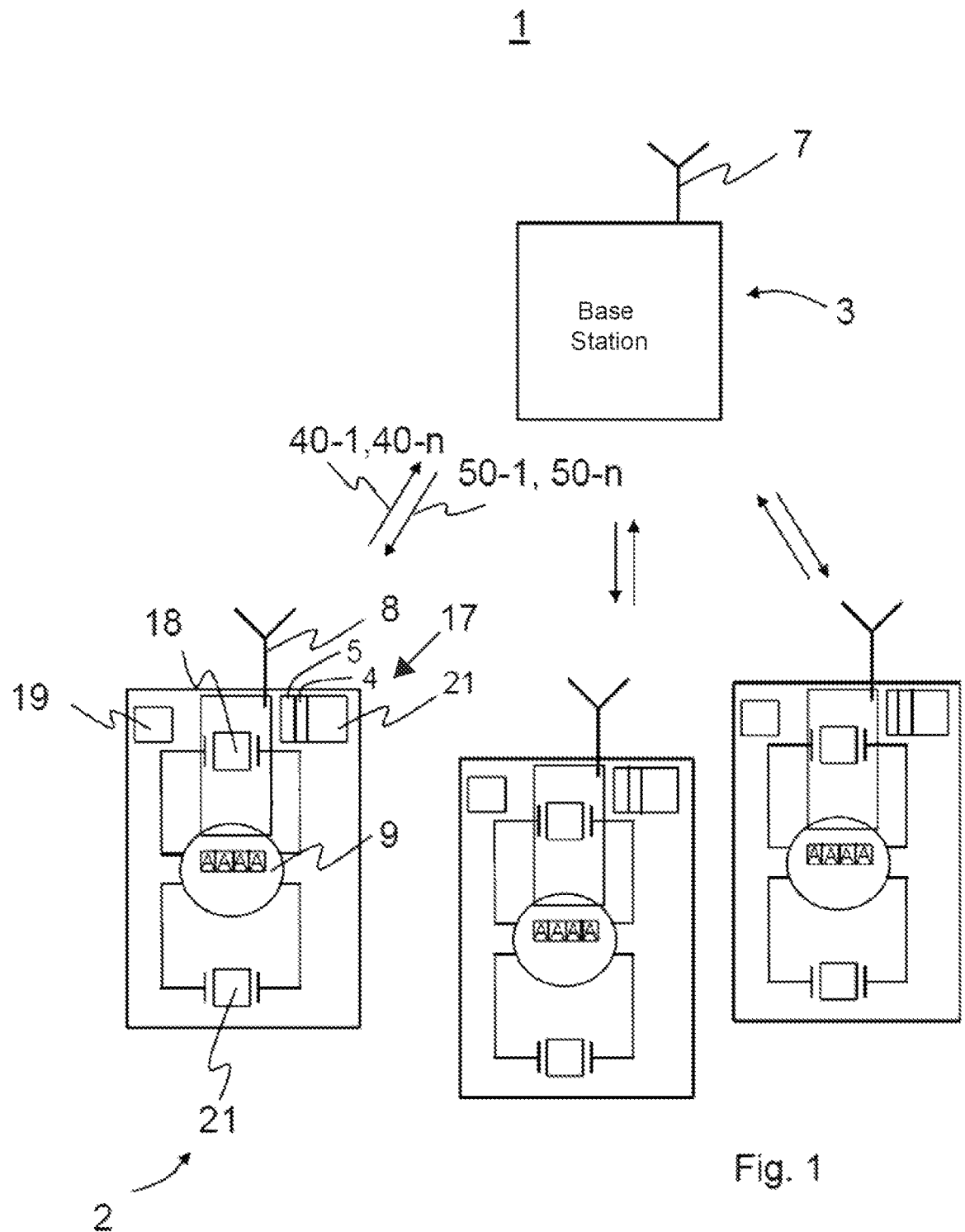
FIG. 1 is a highly simplified block diagram showing an example of a communication network with a base station and multiple related nodes.

Referring now to the figures of the drawings in detail and first, particularly to FIG. 1 thereof, there is shown a radio communication system 1, or radio communication network 1, that contains a base station 3, e.g. a so-called data collector, and a plurality of individual, autonomously operated nodes 2. The nodes 2 are for example sensor devices or meters of any type, for example water meters, heat meters, gas meters or electricity meters, or actuators. A common feature of these nodes 2 is that they have a communication module 17 with an antenna 8 and a control and computing unit 19. In addition, each node 2 has a first frequency generator 18 for generating a carrier frequency for the radio transmission and a second frequency generator 21 used for stipulating the times of transmission of data packets 40-1, 40-$n$ in the uplink and for stipulating the reception window for receiving data packets 50-1, 50-$n$ in the downlink. The first frequency generator 18 is an HF (high-frequency) crystal, which normally has an error in the order of magnitude of 20 ppm. By contrast, the second frequency generator 21 is an LF (low-frequency) crystal, also called a time crystal, which typically has an error in the order of magnitude of 100 ppm. This corresponds to a timing error of 100 µs/s.

The second frequency generator 21 of the node 2 must always be active on account of the chronometer or timer function, whereas the first generator 18 needs to be activated only in the transmission mode and/or reception mode. Otherwise, it is in a sleep mode. Each node 2 is operated with energy autonomy, i.e. has a battery 22 by way of which the individual functional units of the node 1 are supplied with energy. In this case, the communication module 17, or the control and computing unit 19, is supplied with electrical energy not directly by the battery 22 but by an energy buffer 5. The energy buffer is supplied with electrical energy, i.e. charged, by way of a charging unit 4, or a charging circuit to which the battery 22 belongs.

Each node 2 may for example also be provided with a display 9, if desired.

The radio communication system 1 shown in FIG. 1 is operated bidirectionally. The uplink is used to transmit data packets 40-1, 40-$n$ from the respective node 2 to the base station 3, where they are received via the antenna 7 thereof. The downlink is used to transmit data packets 50-1, 50-$n$ from the base station to each individual node 2, the data packets being received by the antennas 8 thereof.

Preferably, the SRD band or the ISM band is used for the data transmission, the bands providing frequency bandwidths for a wide variety of applications without requiring a license.

Figure 2:
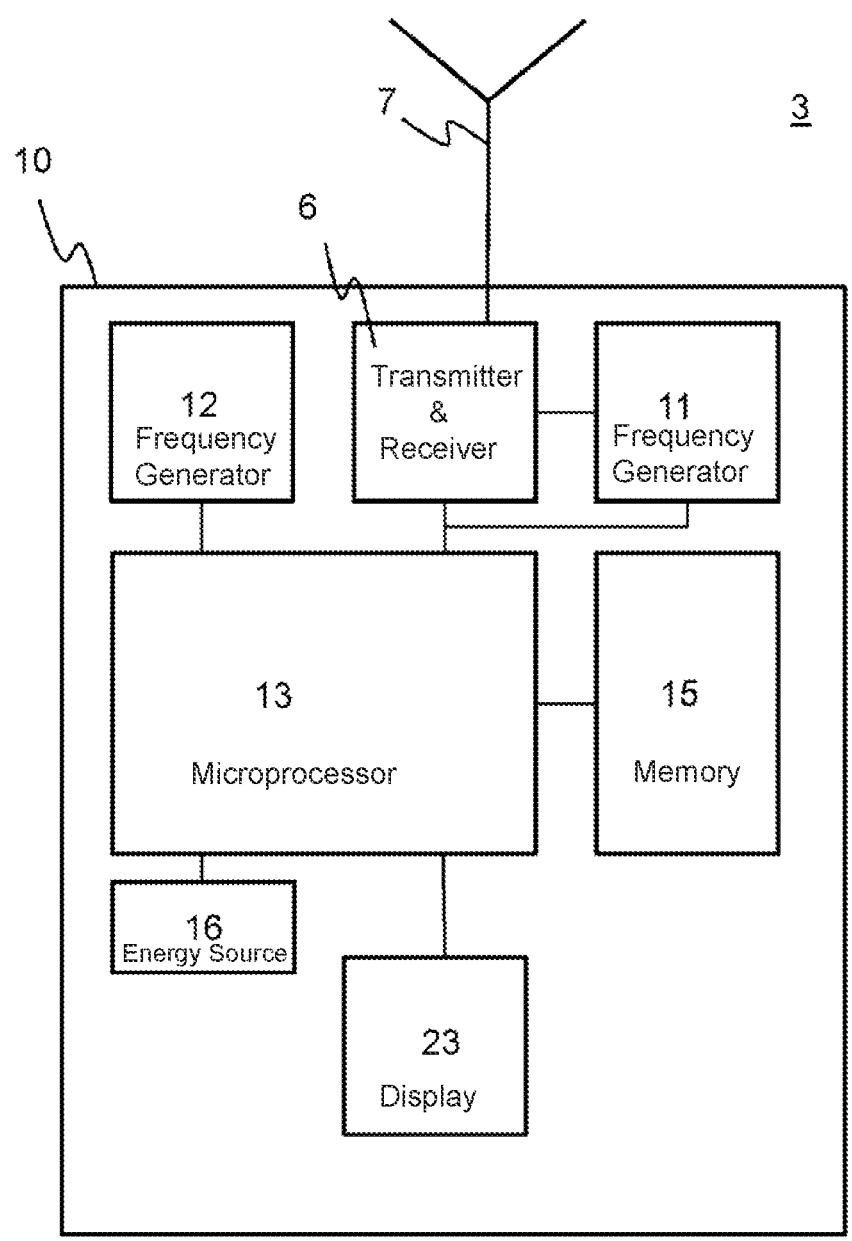
FIG. 2 is a highly simplified block diagram showing an example of a base station for a communication network as shown in FIG. 1.

FIG. 2 shows a highly simplified schematic depiction of an illustrative design of a base station 3 of the communication system 1 shown in FIG. 1, which base station is operated on an energy-autonomous basis. The base station 3 contains a transmission and reception part 6 with an antenna 7, and a microprocessor 13 that has a memory 15 and controls the display 23.

In addition, the base station 3 has a first frequency generator 11 in the form of an HF (high-frequency) crystal and a second frequency generator 12 in the form of an LF (low-frequency) crystal. The second frequency generator 12 is used for time recording and, analogously to the second frequency generator 21 of the respective node 2, is therefore always active. The second frequency generator 12 typically likewise has an error in the order of magnitude of 100 ppm. The error of the first frequency generator 11 is in the region of 20 ppm.

By contrast, the first frequency generator 11, analogously to the first frequency generator 18 of the respective node 2, is activated only at times at which the transmission and reception part 6 opens a reception window for receiving the data packets 40-1, 40-$n$ of the respective nodes 2.

The energy source 16 is preferably a battery, in particular a battery having a capacity of 80 Ah max. In order to achieve an autonomous operating period for several years with such an energy source, the base station 3 cannot be always activated. The base station 3, or the transmission and reception part 6 thereof, should be activated, that is to say form a reception window, only if the respective node 2 transmits data packets 40-1, 40-$n$ to the base station 2 or the base station 3 sends data packets 50-1, 50-$n$ in the downlink. In the remaining periods, the transmission and reception part 6 of the communication module 10 of the base station 3 should be in the sleep mode.

A time crystal that needs to be used for the respective second frequency generator 21, or 12, typically has an error in the order of magnitude of 100 ppm. This corresponds to a timing error of 100 µs/sec. Assuming that the next data packet will arrive in an hour, this results in an error of 360 ms (60×60×100 µs) over the duration of one hour. A data packet is approximately 10 ms long. The overhead after one hour would then be around 3600%.

The calibration for the time crystal typically results in a residual error in the order of magnitude of 20 ppm. This error would therefore be five times smaller than the error mentioned at the outset and would result in an error of 72 ms or 720% of the length of the data packet of 10 ms.

Figure 3:
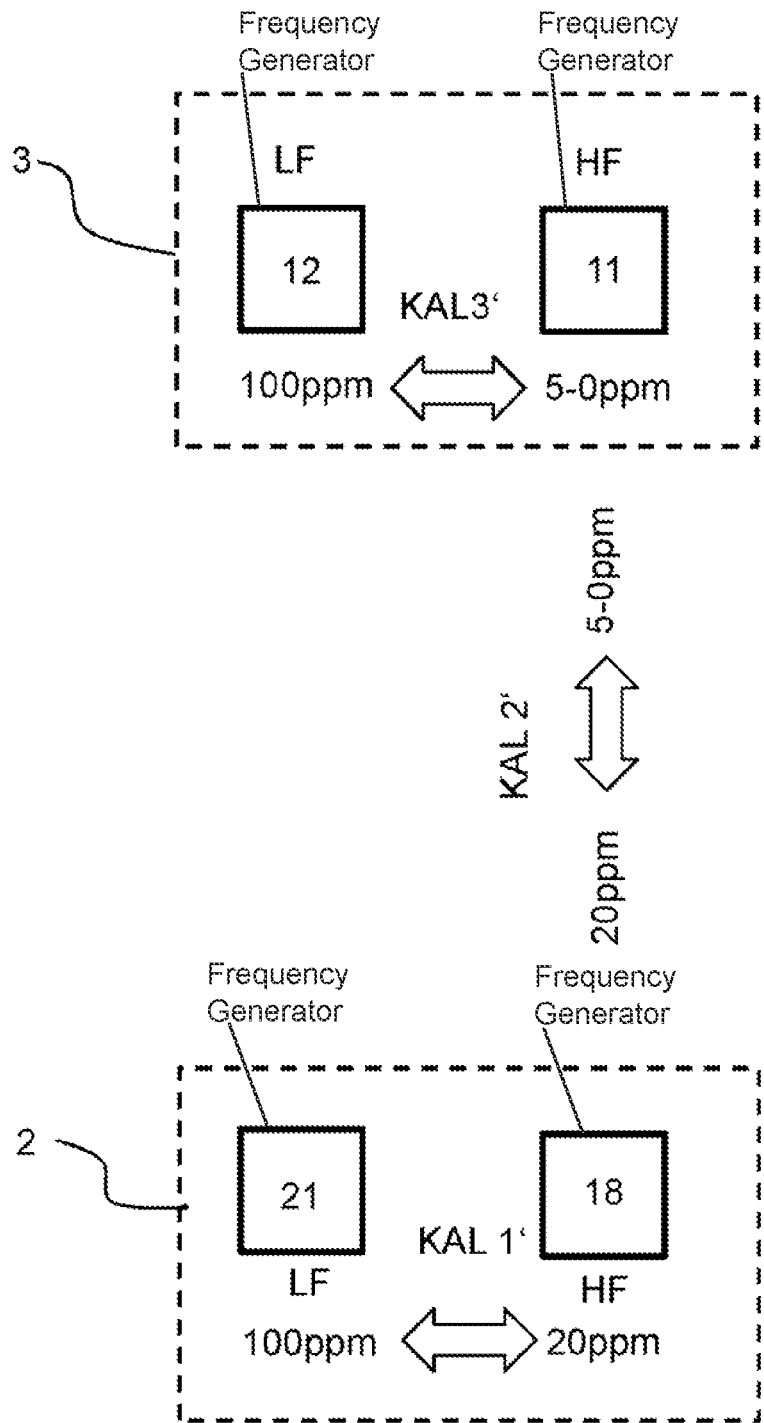
FIG. 3 is a highly simplified block diagram showing a basic calibration principle of the present invention.

FIG. 3 shows a calibration KAL1' in the region of the node 2, the calibration being able to be used to reduce the deviation in the node between the second frequency generator 21 and the first frequency generator 18 from approximately 100 ppm to 20 ppm using the approach described in German patent DE 10 2005 020 349 B4.

Furthermore, when a data packet 40-1, 40-$n$ from the respective node 2 is received, a calibration KAL2' is performed between the first frequency generator 11 of the base station 3 and the first frequency generator 18 of the respective node 2 and is stored in the base station 3. This allows the error in the base station 3 of 20 ppm to be significantly reduced, namely theoretically to an error of 0 ppm. Since the calibration method has only a finite accuracy in the practical implementation (for example on account of temperature variations and the like), however, a reduction to a range of 5-0 ppm should realistically be targeted.

The additional improvement in accuracy achieved thereby therefore once again corresponds to a factor of at least 4.

According to the invention, a calibration KAL3' for the second frequency generator 12 of the base station 3 and the first frequency generator 11 of the base station 3 is also carried out.

FIG. 4 shows, by way of illustration and schematically, the transmission of a telegram 40 (payload data) in the uplink and of a telegram 50 after this in the downlink. For the transmission, a plurality of individual data packets 40-1 to 40-$n$ (morsels) are formed from the telegram 40, the length of each of which is less than the length of the telegram 40. In node 2, as shown in FIG. 3, the higher-frequency first frequency generator 18 (crystal for carrier frequency) and the lower-frequency second frequency generator 21 (crystal for timekeeping), which has a higher temperature-related offset, however, are measured against one another (calibration KAL1') and the resulting frequency deviation is stored in a memory of the respective node 2.

The node 2 in question transmits a data packet e.g. 40-1 at the time t1, the carrier frequency being generated by the first frequency generator 18.

The node 2 in question transmits the data packet 40-1, the time t1 of transmission thereof being generated by the second frequency generator 21 and the measured deviation ascertained by the calibration KAL1' already being taken into account. The transmission of the data packet 40-1 behaves as if the time t1 of transmission thereof had been generated by the first frequency generator 18.

The data packet 40-1 of the node 2 is received by the base station 3, the deviation between the first frequency generator 18 and the first frequency generator 11 of the base station 3 being ascertained and stored by means of a frequency estimate (KAL2').

The base station 3 can also ascertain, or correct, this deviation (KAL3') by measuring the frequencies of the first frequency generator 11 of the base station 3 and the second frequency generator 12 of the base station 3, and can store the deviation (e.g. in ppm).

The respective node 2 transmits the next data packet 40-2 with a correction factor based on the deviation between the first frequency generator 18 of the node 2 and the second frequency generator 21 of the node 2. In other words, the node transmits in time as if the time has been generated by the first frequency generator 18 of the node 2.

Since the time of the reception window of the base station 3 for the next data packet is stipulated in the base station 3 after the calibration KAL3', the next reception window could also only be generated by the first frequency generator 11.

On the basis of the reception of the last data packet, the base station 3 knows the frequency deviation between the first frequency generator 11 of the base station 3 and the first frequency generator 18 of the node 2. The reception window of the base station 3 is corrected as if the first frequency generator 11 is running at the same speed or frequency as the first frequency generator 18 of the node 2. If the temperature remains constant until the next data packet, it can be expected that the reception window will be hit perfectly. In practice, the temperature changes, with the result that there may be deviations of e.g. +−5 ppm, depending on the period in between.

The calibrations KAL1' and KAL3' are not ideal but depend on the calibration length. A residual accuracy error for the calibration therefore remains.

To receive the next data packet, the base station 3 adds the deviation-related time misalignment between the first frequency generator 11 of the base station 3 and the first frequency generator 18 of the node 2 and the time misalignment between the first frequency generator 11 of the base station 3 and the second frequency generator 12 of the base station 3.

The calibration between the first frequency generator 11 and the second frequency generator 12 of the base station is carried out in the base station 3 during the respective open reception window and can therefore take longer than in the node 2. This allows the residual error in the base station 3 to be reduced further.

The invention eliminates a difference between the frequencies of the first frequency generators 11 and 18.

The calibration KAL2' between the frequency of the first frequency generator 18 of the node 2 and the frequency of the first frequency generator 11 of the base station 3 can also be ascertained by the communication module 10 in the base station 3 on the basis of an estimate of at least one parameter of the radio signal transmitted by the communication module 17 and received by the communication module 10 from the following parameter group:
 carrier frequency, and/or
 bandwidth, and/or
 data rate, and/or
 reception time between two data packets, and/or
 frequency swing, and/or
 modulation index.

A corresponding method is described in published, non-prosecuted German patent application DE 2016 014 375 A1, the full content of which is referred to.

For example, an estimate can also be made on the basis of multiple such parameters, e.g. on the basis of the difference between two carrier frequencies or reception times or on the basis of a weighted averaging of multiple values such as e.g. on the basis of a filtering of N carrier frequencies.

Following the transmission of the data packets 40-1 to 40-$n$ in the uplink, a telegram 50 is transmitted from the base station 3 to the respective node 2, as shown in FIG. 4, in the downlink. Accordingly, the telegram 50 is divided into individual data packets (morsels) 50-1 to 50-$n$, the length of each of which is less than the length of the telegram 50, which data packets, as shown in FIG. 4, can be transmitted on different frequencies. Alternatively, the data packets 50-1 to 50-$n$ could also be sent on a single frequency.

The period of time between the last calibration KAL1' for the first frequency generator 18 and the second frequency generator 21 of the node (around the time t1) until the last data packet 50-$n$ is received at the time to can be relatively long. It can be several seconds or even minutes. The temperature during this period of time influences in particular the frequency of the second frequency generator (time crystal) of the node 2 and thus the position of the time window of the node 2 for receiving the data packets 50-1, 50-$n$. In addition, the higher frequency (carrier frequency) of the first frequency generators is also influenced.

According to the invention, the node 2 performs a new calibration KAL1 for the first frequency generator 18 and the second frequency generator 21 of the node 2 between two data packets, e.g. between the data packets 50-3 and 50-4, of the individual data packets 50-1 to 50-$n$ of the telegram, that is to say for example at the time t3. The second frequency generator 21 of the node is thus corrected in terms of its error that has arisen since the previous calibration KAL1'. At the same time, the node 2 sends an intermediate calibration packet 60 in the uplink to the base station 3 at the time t3. The base station can thus take the intermediate calibration packet 60 as a basis for correcting the interval of time for opening the reception window of the node.

Sending of the intermediate calibration packet 60 can also result in a calibration KAL2 for the first frequency generator 18 of the node and the first frequency generator 11 of the base station taking place, as a result of which the deviations of the carrier frequency of the individual nodes 2 of the network in relation to the frequency of the first frequency generator 11 of the base station 3 can be adjusted. This means that the respective carrier frequency can be adjusted exactly and it can thus be ensured that the downlink signal fits into the narrow filter of the base station very exactly. As a result, the signal-to-noise ratio of the input signal at node 2 can be optimized, i.e. optimized reception can be guaranteed.

In addition, an adjustment KAL3 for the first frequency generator 11 and the second frequency generator 12 of the base station 3 can also be made in the base station 3.

The data packets 50-4 to 50-$n$ sent after the intermediate calibration packet 60 has been received thus have a significantly higher probability of hitting the reception window of the respective node 2 exactly, or of being received by the respective node given a high level of noise rejection. The time- or temperature-related offset (delay) of the time frequency and carrier frequency can therefore be reduced to a very considerable extent in relation to receiving data packets in the downlink.

The invention also makes it possible to spread the temporal arrangement of the individual data packets 50-1 to 50-n, i.e. to pull said data packets apart. This in turn allows significantly cheaper energy buffers than previously to be used in the respective node and base station, since the electrical energy of the energy buffer for transmitting and receiving the data packets 50-1 to 50-n no longer has to be provided over a comparatively short period, unlike previously.

The spreading described above allows the pauses between two data packets to be made significantly larger than previously. The invention makes it possible to pull the data packets 50-1 to 50-n apart to such an extent that the mean pause between two data packets is greater than 500 ms, preferably greater than 700 ms, particularly preferably greater than 900 ms.

The intermediate calibration packet 60 has a significantly shorter length than the conventional uplink data packets 40-1, 40-n, as is also shown in the series of FIGS. 5A to 5C. This additionally increases the probability of the intermediate calibration packet 60 being able to be successfully received by the respective node 2.

FIGS. 5A-5D show the structure of a data packet by way of illustration using the data packet 40-1 that is transmitted from the node 2 in the uplink to the base station 3. The data packet comprises packet core data 400-3, which in turn include pilots 400-1 and the respective node-specific ID. The area 400-4 contains the packet payload data.

The intermediate calibration packet 60 transmitted can be for example only pilots 60-1, 60-2, i.e. individual pilot sequences. Pilots are bits, or bit sequences, that are known both to the respective node 2 and to the base station 3. For example, the intermediate calibration packet 60 provided may be two pilots 60-1, 60-2 sent at a defined interval. For example, 15-bit pilot sequences can each be sent at a 30-bit interval. Since data packets usually have a length of more than 30 bits, the communication module 10, or the sync detection of the base station 3, knows that the received pilots 60-1, 60-2 are an intermediate calibration packet 60.

Alternatively, for example multiple, e.g. two, pilot sequences 60-1, 60-2 can be sent immediately successively, that is to say without a gap, as is shown in FIG. 5C. The communication module 10, or the sync detection of the base station 3, can also recognize from this that an intermediate calibration packet 60 is involved. In this case, the power and/or carrier frequency of the pilot sequences should be approximately the same in order to ensure that the pilot sequences originate from the same node.

Alternatively, together with one or more pilots 60-1, 60-2, as shown in FIG. 5D, the ID of the respective node 2 can also be sent in addition.

No further payload is necessary for the intermediate calibration packet 60.

An intermediate calibration packet 60 can preferably also be sent repeatedly between two different data packets 50-1 to 50-n during the transmission of the telegram 50 in the downlink. If an intermediate calibration packet 60 is lost, this means that a calibration can still take place with increased probability during the transmission of the telegram 50 in the downlink.

The correction of the transmission time and/or the carrier frequency of the data packets 50-1, 50-n can also take place multiple times in the chronological order of same.

Preferably, the difference between a calibration for the first frequency generator and the second frequency generator of the node and/or a calibration for the first frequency generator of the node and the first frequency generator of the base station and/or a calibration for the first frequency generator of the base station and the second frequency generator of the base station for a previous transmission of data packets with a corresponding subsequent calibration using an intermediate calibration packet can in each case be determined in terms of its frequency difference and taken into account in the base station and/or in the node. In particular, the relevant difference between the calibration for the first frequency generator of the node and the first frequency generator of the base station can be taken into account for the correction of the carrier frequency in the base station.

The following is a summary list of reference numerals and the corresponding structure used in the above description of the invention:

1 communication system
2 node
3 base station
4 charging unit (node)
5 energy buffer (node)
6 transmission and reception part
7 antenna
8 antenna
9 display
10 communication module (base station)
11 first frequency generator (base station)
12 second frequency generator (base station)
13 microprocessor (base station)
14 reception window
15 memory
16 battery
17 communication module (node)
18 first frequency generator (node)
19 control and computing unit (node)
21 second frequency generator (node)
22 battery
23 display
40 telegram uplink
40-1 to 40-n data packet uplink
50 telegram downlink
50-1 to 50-n data packet downlink
60 intermediate calibration packet
60-1 pilot sequence
60-2 pilot sequence
400-1 pilot sequence
400-2 ID
400-3 packet core data
400-4 packet payload data
KAL1' calibration LF/HF in the node
KAL2' calibration HF node/HF base station
KAL3' calibration LF/HF base station
KAL1 calibration LF/HF in the node
KAL2 calibration HF node/HF base station
KAL3 calibration LF/HF base station

The invention claimed is:

1. A method for transmitting data by radio between at least one battery-operated node and a base station in a communication system using bidirectional radio transmission operation, wherein the base station having a communication module with a first base station frequency generator, wherein the at least one battery-operated node having a node communication module with a first node frequency generator and a second node frequency generator with a lower frequency than that of the first node frequency generator, which comprises the steps of:

transmitting the data, via the node communication module of the at least one battery-operated node, to the communication module of the base station in an uplink by splitting a radio telegram into at least two uplink data packets being transmitted successively at intervals of time;

transmitting the data, via the communication module of the base station, to the node communication module of the at least one battery-operated node in a downlink by splitting a radio telegram into at least two downlink data packets being transmitted successively at intervals of time; and correcting a transmission time and/or a carrier frequency of at least one of the downlink data packets between the downlink data packets.

2. The method according to claim 1, which further comprises transmitting an intermediate calibration packet in the uplink to the base station between the data packets.

3. The method according to claim 1, which further comprises performing a calibration for the first node frequency generator and the second node frequency generator of the at least one battery-operated node between the data packets.

4. The method according to claim 1, which further comprises performing a calibration for the first node frequency generator of the at least one battery-operated node and the first frequency generator of the base station between the data packets.

5. The method according to claim 1, wherein:
the communication module of the base station has a second frequency generator, a frequency of said second frequency generator is lower than that of the first frequency generator of the base station; and
a calibration for the first frequency generator of the base station and the second frequency generator of the base station takes place for a correction.

6. The method according to claim 2, which further comprises sending the intermediate calibration packet between two data packets of the plurality of data packets.

7. The method according to claim 2, wherein as a result of reception of the intermediate calibration packet, the base station readjusts the transmission time and/or the carrier frequency of the data packets to be generated following receipt of the intermediate calibration packet.

8. The method according to claim 2, wherein as a result of a calibration for the first node frequency generator and the second node frequency generator of the at least one battery-operated node, the at least one battery-operated node readjusts a reception time for the data packets expected after the intermediate calibration packet has been sent.

9. The method according to claim 2, wherein a provision of the intermediate calibration packet in the at least one battery-operated node results in a calibration for the first node frequency generator and the second node frequency generator of the at least one battery-operated node taking place.

10. The method according to claim 2, which further comprises performing a calibration for the first node frequency generator of the at least one battery-operated node and the first frequency generator of the base station, in the base station, when the intermediate calibration packet is received.

11. The method according to claim 1, wherein:
a previous transmission of the data packets in the uplink has already resulted in a calibration for the first node frequency generator and the second node frequency generator of the at least one battery-operated node; and/or a calibration for the first node frequency generator of the at least one battery-operated node and the first frequency generator of the base station; and/or a calibration for the first frequency generator of the base station and the second frequency generator of the base station having taken place.

12. The method according to claim 2, which further comprises sending the intermediate calibration packet repeatedly.

13. The method according to claim 1, which further comprises performing a correction of the transmission time and/or the carrier frequency of the data packets multiple times in a chronological order of same.

14. The method according to claim 2, wherein the intermediate calibration packet is shorter than the data packets.

15. The method according to claim 2, wherein the intermediate calibration packet sent is exclusively as:
pilots; and/or
ID data; and/or
packet core data.

16. The method according to claim 15, which further comprises sending the pilots at a specific interval from one another or directly successively.

17. The method according to claim 1, wherein a mean pause between two data packets of the data packets is greater than 500 ms.

18. The method according to claim 11, wherein determining and taking into account in the base station and/or in the at least one battery-operated node the following:
a difference between the calibration for the first node frequency generator and the second node frequency generator of the at least one battery-operated node and a new calibration for the first node frequency generator and the second node frequency generator of the at least one battery-operated node; and/or
a difference between the calibration for the first node frequency generator of the at least one battery-operated node and the first frequency generator of the base station and a new calibration for the first node frequency generator of the at least one battery-operated node and the first frequency generator of the base station;
and/or a difference between the calibration for the first frequency generator of the base station and the second frequency generator of the base station and a new calibration for the first frequency generator of the base station and the second frequency generator of the base station.

19. The method according to claim 1, wherein:
the data is sensor data;
the at least one battery-operated node is permanently installed at a fixed location; and
the at least two data packets are a plurality of data packets.

20. A radio-capable node for transmitting data to a base station via a wireless communication channel, the radio-capable node comprising:
a control and computing unit, said control and computing unit being programmed to perform the method according to claim 1;
a first frequency generator;
a second frequency generator;
a communication module with an antenna; and
a battery.

* * * * *